(12) United States Patent
Ray, Jr. et al.

(10) Patent No.: US 11,897,996 B2
(45) Date of Patent: Feb. 13, 2024

(54) AMMONIA AND AMMONIUM HYDROXIDE STABILIZERS FOR PARAFORMALDEHYDE

(71) Applicant: Celanese International Corporation, Pasadena, TX (US)

(72) Inventors: John Leslie Ray, Jr., Kingsville, TX (US); Kenneth Allen Windhorst, Portland, TX (US); Martin Dominic Mancha, Corpus Christi, TX (US)

(73) Assignee: Celanese International Corporation, Irving, TX (US)

( * ) Notice: Subject to any disclaimer, the term of this patent is extended or adjusted under 35 U.S.C. 154(b) by 353 days.

(21) Appl. No.: 17/277,611

(22) PCT Filed: Sep. 5, 2019

(86) PCT No.: PCT/US2019/049734
§ 371 (c)(1),
(2) Date: Mar. 18, 2021

(87) PCT Pub. No.: WO2020/068390
PCT Pub. Date: Apr. 2, 2020

(65) Prior Publication Data
US 2022/0033559 A1 Feb. 3, 2022

Related U.S. Application Data

(60) Provisional application No. 62/738,213, filed on Sep. 28, 2018.

(51) Int. Cl.
C08G 2/28 (2006.01)
C08G 2/08 (2006.01)

(52) U.S. Cl.
CPC ........... *C08G 2/28* (2013.01); *C08G 2/08* (2013.01)

(58) Field of Classification Search
None
See application file for complete search history.

(56) References Cited

U.S. PATENT DOCUMENTS

| | | | |
|---|---|---|---|
| 3,000,861 A | * | 9/1961 | Schweitzer .......... H04B 17/404 74/DIG. 10 |
| 4,550,213 A | | 10/1985 | Thigpen et al. |
| 5,898,087 A | | 4/1999 | Cheung et al. |

FOREIGN PATENT DOCUMENTS

| | | | |
|---|---|---|---|
| GB | 1502359 A | | 3/1978 |
| JP | 54122214 A | * | 9/1979 |
| TW | 408149 B | | 10/2000 |
| WO | 97/34941 A1 | | 9/1997 |

OTHER PUBLICATIONS

JP54122214 (JPS54122214) English Machine Translation, prepared Jun. 15, 2023. (Year: 2023).*
ISRWO of related PCT/US2019/049734 dated Dec. 17, 2019.
First Office Action issued by China National Intellectual Property Administration on Sep. 15, 2023 for Appln No. 201980060701.5, all pages.

* cited by examiner

*Primary Examiner* — Christopher M Rodd
(74) *Attorney, Agent, or Firm* — Kilpatrick Townsend & Stockton LLP; Valerie C. Moore

(57) ABSTRACT

A process for forming stabilizing paraformaldehyde can include heating a formaldehyde solution comprising 30 wt % or more formaldehyde to a temperature ranging from about 70° C. to about 130° C.; aging the formaldehyde solution for a sufficient amount of time to polymerize the formaldehyde and form paraformaldehyde; solidifying the paraformaldehyde; and contacting the formaldehyde solution before and/or during heating, the formaldehyde solution during aging, the paraformaldehyde, and/or the solidified paraformaldehyde with an ammonia and/or ammonia hydroxide stabilizer.

18 Claims, 1 Drawing Sheet

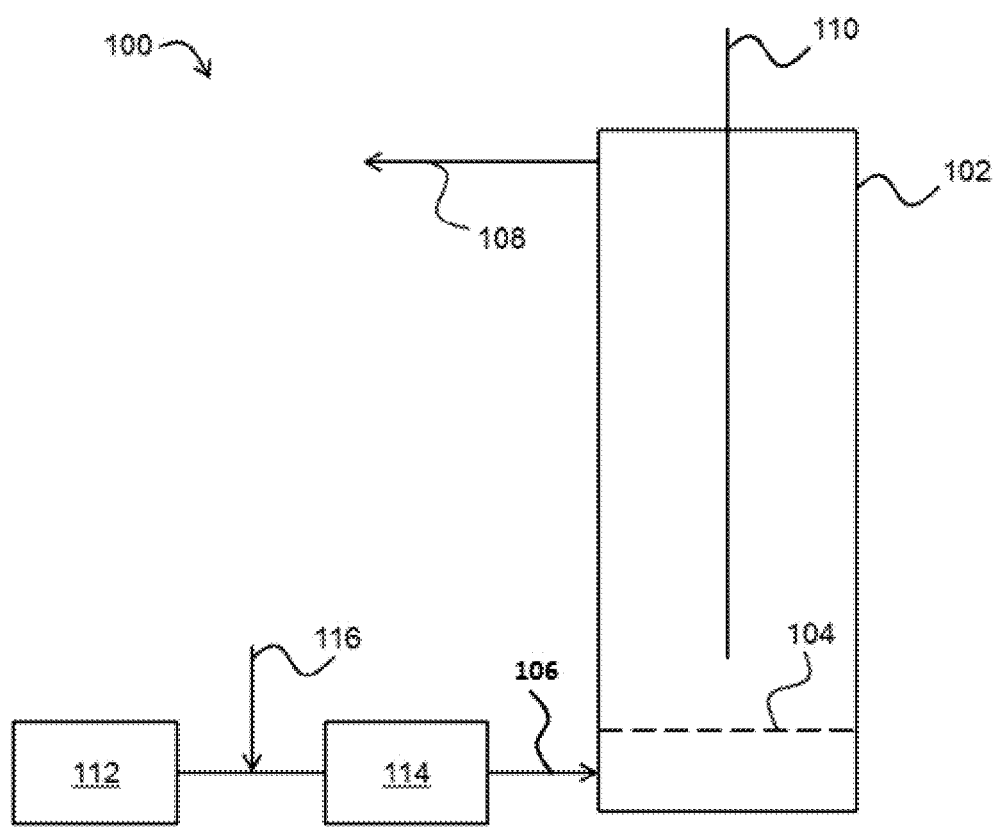

AMMONIA AND AMMONIUM HYDROXIDE STABILIZERS FOR PARAFORMALDEHYDE

BACKGROUND

The present disclosure relates to improved storage life, handling, and transporting of paraformaldyehyde.

Paraformaldehyde is a solid form of 80% or more formaldehyde. Typically, the formaldehyde concentration ranges from 90% to 96%. Paraformaldehyde is thought to be poly(oxymethylene) glycol, $HO-(CH_2O)_n-H$, with n=8-100. Generally, paraformaldehyde is manufactured by concentrating an aqueous hot formaldehyde solution under reduced pressure. Upon cooling, the resulting solution is solidified into prills for storages and/or transportation.

Immediately after it is produced, paraformaldehyde exhibits excellent solubility in water and organic solvents such as butanol. It dissolves readily in water or alcohol by hydrolysis or depolymerization to yield methylene glycol or formal. However, its solubility in water and solvents decreases with time or with storage at temperatures generally greater than about 35° C. This change in solubility is presumably due to changes in the molecular weight (or value of n) and endcapping of paraformaldehyde chain with methanol. The solubility and reactivity of paraformaldehyde decrease with increased molecular weight.

The presence of methanol in the reaction mixture also forms insolubles. Insolubles are generally paraformaldehyde that has been end capped by an alcohol to form ethers. These high molecular weight ethers are insoluble in any solution unless it contains a strong acid. Paraformaldehyde includes insolubles typically at a concentration of about 10 ppm to 20 ppm. Over time as the paraformaldehyde is stored, the small amounts of alcohol in the prills react with the paraformaldehyde to form more insolubles. For example, the concentration of insolubles after storage at ambient temperatures can be exceed 100 ppm and, in some instances, 350 ppm or greater if there are high concentrations of methanol are high. The industry standard for an acceptable amount of insolubles is less than 100 ppm. Accordingly, the shelf-life of paraformaldehyde is very low.

To mitigate this problem, many stabilizers and inhibitors have been proposed. For example, amines such as hexaethylamine and triethylamine have been used. It is believed that the stabilizers slow the chain growth and slow the endcapping of the paraformaldehyde, so insoluble formation over time is reduced. However, the stabilizers also increase the tackiness of the prills, which makes manufacturing and handling very difficult.

BRIEF DESCRIPTION OF THE DRAWINGS

The following FIGURES are included to illustrate certain aspects of the embodiments, and should not be viewed as exclusive embodiments. The subject matter disclosed is capable of considerable modifications, alterations, combinations, and equivalents in form and function, as will occur to those skilled in the art and having the benefit of this disclosure.

The FIGURE illustrates a diagram of an apparatus that simulates a quenching vessel.

DETAILED DESCRIPTION

The present disclosure relates to improved storage life, handling, and transporting of paraformaldyehyde using ammonia and/or ammonium hydroxide as a stabilizer.

As used herein, the term "prill" refers to a pellet or solid globule. The end product paraformaldehyde can also be in the form of flakes, lumps, granulars, and the like depending on how the paraformaldehyde is solidified and dried. Herein, the end product paraformaldehyde is described in the form of "solidified paraformaldehyde," which can be any suitable solidified form including but not limited to, prills, flakes, lumps, granulars, and the like.

In low concentrations, hydrocarbon amines can stabilize solidified paraformaldehyde without causing the solidified paraformaldehyde to become tacky. However, the concentration of hydrocarbon amines is sufficiently low that the shelf-life of the solidified paraformaldehyde is not appreciably extended. At higher concentrations, the hydrocarbon amines make the solidified paraformaldehyde tacky to a point that it cannot be transported by normal means like compressed air.

It has been discovered that the use of ammonia and/or ammonium hydroxide as a stabilizer for paraformaldyehyde produces a solidified paraformaldehyde that is not tacky and has a long shelf-life because it can be used in high concentrations. Urea may be used as a source of ammonia by mixing the urea with water and heating.

Without being limited by theory, it is believed that the ammonia and/or ammonium hydroxide reacts with the ends of the paraformaldehyde chains to form an oxime that is crystalline and also neutralizes any acidic catalysts both of which effectively inhibit chain growth and alcohol endcapping of the solidified paraformaldehyde.

Generally, producing solidified paraformaldehyde includes heating a formaldehyde solution comprising 30 wt % or more formaldehyde (e.g., about 30 wt % to 90 wt % formaldehyde) to a temperature of about 70° C. to about 130° C., preferably about 80° C. to about 100° C. The formaldehyde solution is maintained at this temperature for about 0.1 hours to about 3 hours, preferably about 20 minutes to about 40 minutes, and more preferably about 20 minutes to about 30 minutes. This is often referred to as aging. During aging, the formaldehyde polymerizes to form paraformaldehyde. Once the aging step is complete, the paraformaldehyde product is solidified. To form prills specifically, the paraformaldehyde is passed through a nozzle to form prills that fall into a countercurrent flow of gas in a prilling tower. This solidifies the paraformaldehyde. The polymerization reaction can still be occurring during the solidification of the paraformaldehyde. Optionally, the solidified paraformaldehyde is transferred, typically using compressed air, to a quenching vessel to further cool. The solidified paraformaldehyde can be dried at temperatures from about ambient temperature to about 150° C., preferably about 50° C. to about 100° C., for a time of from about 15 minutes to about 20 hours, preferably from about 1 hour to about 2 hours. The polymerization reaction can still be occurring during the drying of the solidified paraformaldehyde. The solidified paraformaldehyde is then stored or transported to a customer. Handling and transporting the solidified paraformaldehyde within a plant or to and from storage is typically conducted with compressed air. The use of ammonia and/or ammonium hydroxide stabilizer does not make the solidified paraformaldehyde sticky like other amine stabilizers, so the handling and transporting of the solidified paraformaldehyde is essentially the same as untreated solidified paraformaldehyde. The ammonia and/or ammonium hydroxide stabilizer can be incorporated in any portion of the manufacturing or storage of the paraformaldyehyde.

An example embodiment of the disclosure includes: heating a formaldehyde solution comprising 30 wt % or more formaldehyde and about 50 ppm to about 1000 ppm, preferably 100 ppm to 500 ppm, more preferably 150 ppm to 250 ppm, an ammonia and/or ammonium hydroxide stabilizer to a temperature ranging from about 70° C. to about 130° C.; aging the formaldehyde solution for a sufficient amount of time to polymerize the formaldehyde and form paraformaldehyde; and solidifying the paraformaldehyde (e.g., transferring the paraformaldehyde through a nozzle to form prills that fall into a countercurrent flow of gas in a prilling tower to further polymerize and solidify). The method can further include drying the solidified paraformaldehyde.

Another example embodiment of the disclosure includes: heating a formaldehyde solution comprising 30 wt % or more formaldehyde to a temperature ranging from about 70° C. to about 130° C.; aging the formaldehyde solution in the presence of about 50 ppm to about 1000 ppm, preferably 100 ppm to 500 ppm, more preferably 150 ppm to 250 ppm, an ammonia and/or ammonium hydroxide stabilizer for a sufficient amount of time to polymerize the formaldehyde and form paraformaldehyde; and solidifying the paraformaldehyde (e.g., transferring the paraformaldehyde through a nozzle to form prills that fall into a countercurrent flow of gas in a prilling tower to further polymerize and solidify). The method can further include drying the solidified paraformaldehyde.

Yet another example embodiment of the disclosure includes: heating a formaldehyde solution comprising 30 wt % or more formaldehyde to a temperature ranging from about 70° C. to about 130° C.; aging the formaldehyde solution for a sufficient amount of time to polymerize the formaldehyde and form paraformaldehyde; and solidifying the paraformaldehyde in the presence of a gas (e.g., transferring the paraformaldehyde through a nozzle to form prills that fall into a countercurrent flow of gas) that comprises about 10 ppm to about 1000 ppm, preferably 25 ppm to 500 ppm, more preferably 50 ppm to 150 ppm, an ammonia and/or ammonium hydroxide stabilizer in a prilling tower to further polymerize and solidify. The method can further include drying the solidified paraformaldehyde.

Another example embodiment of the disclosure includes: heating a formaldehyde solution comprising 30 wt % or more formaldehyde to a temperature ranging from about 70° C. to about 130° C.; aging the formaldehyde solution for a sufficient amount of time to polymerize the formaldehyde and form paraformaldehyde; solidifying the paraformaldehyde (e.g., transferring the paraformaldehyde through a nozzle to form prills that fall into a countercurrent flow of gas in a prilling tower to further polymerize and solidify); drying the solidified paraformaldehyde; and exposing the solidified paraformaldehyde during and/or after drying to a gas that comprises about 10 ppm to about 1000 ppm, preferably 25 ppm to 500 ppm, more preferably 50 ppm to 150 ppm, an ammonia and/or ammonium hydroxide stabilizer.

Another example embodiment of the disclosure includes: heating a formaldehyde solution comprising 30 wt % or more formaldehyde to a temperature ranging from about 70° C. to about 130° C.; aging the formaldehyde solution for a sufficient amount of time to polymerize the formaldehyde and form paraformaldehyde; solidifying the paraformaldehyde (e.g., transferring the paraformaldehyde through a nozzle to form prills that fall into a countercurrent flow of gas in a prilling tower to further polymerize and solidify); drying the solidified paraformaldehyde; transporting the solidified paraformaldehyde to a storage facility; and exposing the solidified paraformaldehyde during transporting or in the storage facility to a gas that comprises about 10 ppm to about 1000 ppm, preferably 25 ppm to 500 ppm, more preferably 50 ppm to 150 ppm, an ammonia and/or ammonium hydroxide stabilizer.

Combinations of the foregoing methods can be used. For example, the ammonia and/or ammonium hydroxide stabilizer can be used in one or more of the heating, aging, solidifying drying, or storing steps. When two or more steps include exposure to the ammonia and/or ammonium hydroxide stabilizer, lower concentrations of the ammonia and/or ammonium hydroxide stabilizer may be used in each step.

In each of the foregoing embodiments, urea may be used as a source of the ammonia and/or ammonium hydroxide stabilizer.

In each of the foregoing embodiments, the formaldehyde solution can comprise 30 wt % or more formaldehyde (e.g., about 30 wt % to 90 wt % formaldehyde), preferably about 35 wt % to 75 wt % formaldehyde, and more preferably about 36 wt % to 50 wt % formaldehyde.

In each of the foregoing embodiments, the formaldehyde solution can be heated to a temperature of about 70° C. to about 130° C., preferably about 80° C. to about 100° C.

In each of the foregoing embodiments, the formaldehyde solution can be maintained (aged) at a temperature of about 70° C. to about 130° C., preferably about 80° C. to about 100° C., for about 0.1 hours to about 3 hours, preferably about 20 minutes to about 40 minutes, and more preferably about 20 minutes to about 30 minutes.

In each of the foregoing embodiments, the solidified paraformaldehyde can be dried at temperatures from about ambient temperature to about 150° C., preferably about 50° C. to about 100° C., for a time of from about 15 minutes to about 20 hours, preferably from about 1 hour to about 2 hours.

Exposing the solidified paraformaldehyde to the ammonia and/or ammonium hydroxide stabilizer at any time between and including forming and storage can include exposing the solidified paraformaldehyde to a gas comprising about 10 ppm to about 1000 ppm, preferably 25 ppm to 500 ppm, more preferably 50 ppm to 150 ppm, the ammonia and/or ammonium hydroxide stabilizer. The ammonia and/or ammonium hydroxide stabilizer can be diluted in a carrier gas. Examples of carrier gases include, but are not limited to, air, oxygen, nitrogen, carbon dioxide, argon, and the like, and any combination thereof.

In each of the foregoing embodiments, the formaldehyde solution can further comprise an acid or basic catalyst. Examples of catalysts include, but are not limited to, formic acid, boric acid, sodium tetraborate, oxalic acid, and any combination thereof.

In each of the foregoing embodiments, the formaldehyde solution, the paraformaldehyde, and the solidified paraformaldehyde can have an absence of an organic amine. As used herein, the term "organic amine" includes low molecular weight compounds (less than 500 g/mol, preferably less than 300 g/mol) composed of carbon, hydrogen, nitrogen, and optionally oxygen. Examples of organic amines include, but are not limited to, methylamine, ethyl amine, n-propylamine, n-butylamine, iso-butylamine, tertbutylamine, dimethyl amine diethylamine, di-n-propylamine, di-iso-propylamine, dibutylamine, triethylamine, and triethanolamine, hexamethylenetetramine, 2-ethylhexylamine, 2-aminopropanediol, hexylamine, ethanolamine, mixed $C_{20}$ amine, mixed $C_{10}$ amine, cyclohexylamine, 1,2 dimethoxypropane amine, triethylamine, ethanolamine, 1-amino-1,3-propanediol, 1-aminopentane, 2-methyloxypropylamine, and any combination thereof.

In each of the foregoing embodiments, the method may further include storing the solidified paraformaldehyde for greater than 30 days (e.g., 30 days to one year or longer) at ambient to 50° C. without increasing the insolubles concentration in the solidified paraformaldehyde above about 150 ppm, preferably about 120 ppm, more preferably about 100 ppm.

An additional embodiment of the present disclosure is a paraformaldehyde composition comprising about 1 ppm to 100 ppm, preferably about 5 ppm to about 50 ppm, more preferably about 10 ppm to about 25 ppm, of an ammonia and/or ammonium hydroxide stabilizer and about 80 wt % to about 99.9 wt %, preferably about 90 wt % to about 99.9 wt %, more preferably about 95 wt % to about 99.9 wt %, of paraformaldehyde.

The paraformaldehyde composition can also comprise about 1 ppm to about 200 ppm, preferably about 5 ppm to about 100 ppm, more preferably about 10 ppm to about 50 ppm, of insolubles.

In each of the foregoing paraformaldehyde composition embodiments, the paraformaldehyde composition can further comprise an acid or basic catalyst. Examples of catalysts include, but are not limited to, formic acid, boric acid, sodium tetraborate, oxalic acid, and any combination thereof.

a source of the ammonia and/or ammonia hydroxide stabilizer is urea In each of the foregoing paraformaldehyde composition embodiments, the paraformaldehyde composition can have an absence of an organic amine. Examples of organic amines include, but are not limited to, methylamine, ethyl amine, n-propylamine, n-butylamine, iso-butylamine, tertbutylamine, dimethyl amine diethylamine, di-n-propylamine, di-iso-propylamine, dibutylamine, triethylamine, and triethanolamine, hexamethylenetetramine, 2-ethylhexylamine, 2-aminopropanediol, hexylamine, ethanolamine, mixed $C_{20}$ amine, mixed $C_{10}$ amine, cyclohexylamine, 1,2 dimethoxypropane amine, triethylamine, ethanolamine, 1-amino-1,3-propanediol, 1-aminopentane, 2-methyloxypropylamine, and any combination thereof.

For each of the foregoing paraformaldehyde composition embodiments, the solidified paraformaldehyde can be in the form of prills, flakes, lumps, granulars, and the like.

An example embodiment of the present invention is a process comprising: heating a formaldehyde solution comprising 30 wt % or more formaldehyde to a temperature ranging from about 70° C. to about 130° C.; aging the formaldehyde solution for a sufficient amount of time to polymerize the formaldehyde and form paraformaldehyde; solidifying the paraformaldehyde; and contacting the formaldehyde solution before and/or during heating, the formaldehyde solution during aging, the paraformaldehyde, and/or the solidified paraformaldehyde with an ammonia and/or ammonia hydroxide stabilizer. Optionally, the process can include one or more of the following: Element 1: wherein the formaldehyde solution during heating further comprises about 50 ppm to about 1000 ppm of the ammonia and/or ammonium hydroxide stabilizer; Element 2: wherein the formaldehyde solution during aging further comprises about 50 ppm to about 1000 ppm of the ammonia and/or ammonium hydroxide stabilizer; Element 3: wherein solidifying the paraformaldehyde involves contacting the paraformaldehyde with a gas comprising about 10 ppm to about 1000 ppm of the ammonia and/or ammonium hydroxide stabilizer; Element 4: the process further comprising: drying the solidified paraformaldehyde; Element 5: Element 4 and the process further comprising: exposing the solidified paraformaldehyde during and/or after drying to a gas that comprises about 10 ppm to about 1000 ppm of the ammonia and/or ammonium hydroxide stabilizer; Element 6: Element 4 or 5 and the process further comprising: transporting the solidified paraformaldehyde to a storage facility; Element 7: Element 6 and the process further comprising: exposing the solidified paraformaldehyde during transporting or in the storage facility to a gas that comprises about 10 ppm to about 1000 ppm of the ammonia and/or ammonium hydroxide stabilizer; Element 8: Element 6 or 7 and the process further comprising: storing the solidified paraformaldehyde for greater than 30 days at ambient to about 50° C. and maintaining an insolubles concentration in the solidified paraformaldehyde less than about 150 ppm; Element 9: wherein aging the formaldehyde solution is for about 0.1 hours to about 3 hours; Element 10: wherein an organic amine is not included in the process; Element 11: the process further comprising: transporting the solidified paraformaldehyde to a storage facility; Element 12: wherein aging the formaldehyde solution is at 70° C. to 130° C.; and Element 13: wherein a source of the ammonia and/or ammonia hydroxide stabilizer is urea. Examples of combinations include, but are not limited to, Elements 1, 4, and 11 in combination; Elements 2, 4, and 11 in combination; Elements 3, 4, and 11 in combination; Elements 4, 5, and 11 in combination; Elements 4, 6, and 7 (and optionally 8) in combination; Elements 1, 4, 6, and 8 in combination; Elements 2, 4, 6, and 8 in combination; Elements 3, 4, 6, and 8 in combination; two or more of Elements 1, 2, 3, 4, and 5 in combination optionally in further combination with Elements 6 and 7; and Elements 9, 12, and/or 13 in combination with any of the foregoing.

Another example embodiment of the present invention is a process comprising: exposing solidified paraformaldehyde to a gas comprising about 10 ppm to about 1000 ppm of an ammonia and/or ammonium hydroxide stabilizer. Optionally, the solidified paraformaldehyde has an absence of an organic amine and/or a source of the ammonia and/or ammonia hydroxide stabilizer is urea.

Yet another example embodiment of the present invention is a solidified paraformaldehyde comprising: about 1 ppm to 100 ppm of an ammonia and/or ammonium hydroxide stabilizer; and about 80 wt % to about 99.9 wt % of paraformaldehyde. Optionally, the solidified paraformaldehyde can include one or more of the following: Element 14: wherein the solidified paraformaldehyde is absent an organic amine; Element 15: the solidified paraformaldehyde further comprising: less than 150 ppm of insolubles; and Element 16: wherein the solidified paraformaldehyde is in the form of prills, flakes, lumps, or granulars.

Unless otherwise indicated, all numbers expressing quantities of ingredients, properties such as molecular weight, reaction conditions, and so forth used in the present specification and associated claims are to be understood as being modified in all instances by the term "about." Accordingly, unless indicated to the contrary, the numerical parameters set forth in the following specification and attached claims are approximations that may vary depending upon the desired properties sought to be obtained by the embodiments of the present invention. At the very least, and not as an attempt to limit the application of the doctrine of equivalents to the scope of the claim, each numerical parameter should at least be construed in light of the number of reported significant digits and by applying ordinary rounding techniques.

One or more illustrative embodiments incorporating the invention embodiments disclosed herein are presented herein. Not all features of a physical implementation are described or shown in this application for the sake of clarity. It is understood that in the development of a physical embodiment incorporating the embodiments of the present invention, numerous implementation-specific decisions must be made to achieve the developer's goals, such as compliance with system-related, business-related, government-related and other constraints, which vary by implementation and from time to time. While a developer's efforts might be time-consuming, such efforts would be, nevertheless, a routine undertaking for those of ordinary skill in the art and having benefit of this disclosure.

While compositions and methods are described herein in terms of "comprising" various components or steps, the compositions and methods can also "consist essentially of" or "consist of" the various components and steps.

To facilitate a better understanding of the embodiments of the present invention, the following examples of preferred or representative embodiments are given. In no way should the following examples be read to limit, or to define, the scope of the invention.

Examples

Example 1. An apparatus 100 according to the FIGURE was used to simulate a quenching vessel. The apparatus 100 includes a dryer tube 102 (2.5 inch radius, 11 inches tall) having a perforated plate 104 at 1.75 inches from the bottom, a gas inlet 106 between the bottom of the dryer tube 102 and the perforated plate 104, and a vent 108 at the top portion of the dryer tube 102. Further, a thermocouple 110 extends through the top of the dryer tube 102 to above the perforated plate to measure the temperature in the dryer tube 102. The gas inlet 106 is fluidly coupled to an ammonia and/or ammonia hydroxide stabilizer source 112 (e.g., a tank of ammonia, a tank of ammonia dilute in air, a solution of urea in water, a solution of ammonium hydroxide, and the like). As used herein, when describing two components as fluidly coupled, there is hardware connecting the two components such that fluid can pass from one component to the other. The hardware may be more than one component including lines, pipes, tubing, pumps, connectors, heat exchangers, valves, and the like.

Between the ammonia and/or ammonia hydroxide stabilizer source 112 is a heat exchanger 114 used to heat the ammonia and/or ammonia hydroxide stabilizer before introduction into the dryer tube 102. Optionally, a gas (e.g., plant air) can be entrained via line 116 with the ammonia and/or ammonia hydroxide stabilizer to dilute the ammonia and/or ammonia hydroxide stabilizer to a desired concentration.

In this example, 350 grams of paraformaldehyde prills were added to the dryer tube 102, which resulted in the top level of prills being 2.5 inches from the top of the dryer tube 102. A tank of 100 ppm of ammonia in air was used as the ammonia and/or ammonia hydroxide stabilizer source 112. The heat exchanger 114 was set at 200° F. (93.3° C.). The 100 ppm of ammonia in air was passed through the apparatus 100 at 30 standard cubic feet per minute, which resulted in the prills becoming a fluidized bed in the dryer tube 102. The prills maintained a fluidized bed indicating that the ammonia and/or ammonia hydroxide stabilizer did not make the prills too tacky for transport.

The same experiment was performed but with ethylhexylamine as the stabilizer. The prills became too tacky to fluidize in the dryer tube 102.

Example 2. In a full-scale plant, paraformaldehyde prills were exposed to ammonium hydroxide at varying concentrations in a prilling tower. More specifically, a 19% solution of ammonium hydroxide in water was heated to about 90° C. The resultant steam was passed through the prilling tower. Optionally, the steam was diluted with plant air. Then, the prills were aged for 4 days at 50° C., which mimics 6 months of aging under normal storage conditions (about 23° C. to 38° C.). The amount of insolubles after aging is provided in Table 1, where the control is prills not exposed to the ammonium hydroxide.

TABLE 1

| Ammonium Hydroxide Concentration | Insolubles Concentration After Aging | Percent Reduction in Insolubles |
|---|---|---|
| 0 ppm | 129 ppm | — |
| 10 ppm | 65 ppm | 60% |
| 20 ppm | 60 ppm | 53% |
| 46 ppm | 50 ppm | 61% |
| 77 ppm | 45 ppm | 65% |
| 86 ppm | 15 ppm | 88% |
| 116 ppm | 45 ppm | 65% |
| 131 ppm | 15 ppm | 88% |
| 155 ppm | 40 ppm | 69% |

In each instance, the prills did not get tacky and were easily transported by standard methods and equipment.

These examples illustrate that an ammonia and/or ammonia hydroxide stabilizer can be used to maintain a low concentration of insolubles in solidified paraformaldehyde when stored and the ability to be handled and transported by conventional means.

Therefore, the present invention is well adapted to attain the ends and advantages mentioned as well as those that are inherent therein. The particular embodiments disclosed above are illustrative only, as the present invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered, combined, or modified and all such variations are considered within the scope and spirit of the present invention. The invention illustratively disclosed herein suitably may be practiced in the absence of any element that is not specifically disclosed herein and/or any optional element disclosed herein. While compositions and methods are described in terms of "comprising," "containing," or "including" various components or steps, the compositions and methods can also "consist essentially of" or "consist of" the various components and steps. All numbers and ranges disclosed above may vary by some amount. Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an," as used in the claims, are defined herein to mean one or more than one of the element that it introduces.

The invention claimed is:

1. A process comprising:
heating a formaldehyde solution comprising 30 wt % or more formaldehyde and about 50 ppm to about 1000 ppm of an ammonia and/or ammonia hydroxide stabilizer to a temperature ranging from about 70° C. to about 130° C.;
aging the formaldehyde solution for a sufficient amount of time to polymerize the formaldehyde and form paraformaldehyde; and
solidifying the paraformaldehyde.

2. The process of claim 1 further comprising:
drying the solidified paraformaldehyde.

3. The process of claim 2 further comprising:
exposing the solidified paraformaldehyde during and/or after drying to a gas that comprises about 10 ppm to about 1000 ppm of the ammonia and/or ammonium hydroxide stabilizer.

4. The process of claim 2 further comprising:
transporting the solidified paraformaldehyde to a storage facility.

5. The process of claim 4 further comprising:
exposing the solidified paraformaldehyde during transporting or in the storage facility to a gas that comprises about 10 ppm to about 1000 ppm of the ammonia and/or ammonium hydroxide stabilizer.

6. The process of claim 4 further comprising:
storing the solidified paraformaldehyde for greater than 30 days at ambient to about 50° C. and maintaining an insolubles concentration in the solidified paraformaldehyde less than about 150 ppm.

7. The process of claim 1, wherein aging the formaldehyde solution is for about 0.1 hours to about 3 hours.

8. The process of claim 1, wherein aging the formaldehyde solution is at 70° C. to 130° C.

9. The process of claim 1, wherein an organic amine is not included in the process.

10. The process of claim 1 further comprising:
transporting the solidified paraformaldehyde to a storage facility.

11. The process of claim 1, wherein a source of the ammonia and/or ammonia hydroxide stabilizer is urea.

12. A process comprising:
exposing solidified paraformaldehyde to a gas comprising about 50 ppm to about 1000 ppm of an ammonia and/or ammonium hydroxide stabilizer.

13. The process of claim 12, wherein the solidified paraformaldehyde has an absence of an organic amine.

14. The process of claim 12, wherein a source of the ammonia and/or ammonia hydroxide stabilizer is urea.

15. The process of claim 12 further comprising:
storing the solidified paraformaldehyde for greater than 30 days at ambient to about 50° C. and maintaining an insolubles concentration in the solidified paraformaldehyde less than about 150 ppm.

16. A process comprising:
heating a formaldehyde solution comprising 30 wt % or more formaldehyde to a temperature ranging from about 70° C. to about 130° C.;
aging the formaldehyde solution in the presence of about 50 ppm to about 1000 ppm of an ammonia and/or ammonia hydroxide stabilizer for a sufficient amount of time to polymerize the formaldehyde and form paraformaldehyde; and
solidifying the paraformaldehyde.

17. The process of claim 16 further comprising:
drying the solidified paraformaldehyde; and
exposing the solidified paraformaldehyde during and/or after drying to a gas that comprises about 10 ppm to about 1000 ppm of the ammonia and/or ammonium hydroxide stabilizer.

18. The process of claim 16, wherein an organic amine is not included in the process.

* * * * *